United States Patent [19]

Takemura et al.

[11] Patent Number: 4,659,214

[45] Date of Patent: Apr. 21, 1987

[54] DOCUMENT DETECTING APPARATUS

[75] Inventors: Yoshinobu Takemura, Nara; Masuo Kawamoto; Masahiro Hashizume, both of Osaka; Katsumi Nagata, Kyoto, all of Japan

[73] Assignee: Mita Industrial Co., Ltd., Osaka, Japan

[21] Appl. No.: 829,777

[22] Filed: Feb. 14, 1986

[30] Foreign Application Priority Data

Feb. 21, 1985 [JP] Japan .................... 60-33355
Mar. 4, 1985 [JP] Japan .................... 60-30667[U]

[51] Int. Cl.⁴ .................... G03B 27/62

[52] U.S. Cl. .................... 355/75

[58] Field of Search .................... 355/41, 75

[56] References Cited

U.S. PATENT DOCUMENTS 4,277,163 7/1981 Ikesue et al. .................... 355/14 R
4,302,098 11/1981 Kan et al. .................... 355/14 R X
4,474,453 10/1984 Yanagawa et al. .................... 355/14 R X
4,540,269 9/1985 Nishiyama .................... 355/75 X
4,568,181 2/1986 Nishiyama .................... 355/75

*Primary Examiner*—Richard A. Wintercorn
*Attorney, Agent, or Firm*—Koda and Androlia

[57] ABSTRACT

A document detecting apparatus for a copying machine, comprising a photo-sensor having a light projecting device which emits a measuring light from an inside of to an outside of a copying machine through an original glass plate, and a light receiving device which is installed at a position deviated from a path symmetric to an optical axis of said measuring light with respect to a normal line set up on a surface of the original glass plate and which is directed to receive a scattered light produced from the measuring light scattered at a surface of an original document placed on the original glass plate; and a microprocessor which judges whether or not the original document exists according to an intensity of a light measured by said photo-sensor.

6 Claims, 10 Drawing Figures

DOCUMENT DETECTING APPARATUS

BACKGROUND OF THE INVENTION

1. Field of the Invention

This invention relates to a document detecting apparatus for a copying machine, which judges whether or not an original document is placed on an original glass plate and determines said document size.

2. Description of the Prior Art

For such a conventional apparatus, there have been apparatuses disclosed in unexamined laid open 78849/1981, 48759/1982, 10172/1982 etc. for example. These apparatuses are adapted to determine an original document size on the original glass plate by detecting a reflected light from the original document surface.

In this reflected light detecting system, however, a measuring light is irradiated to the original document surface through the original glass plate and this reflected light is caught through the original glass plate again. Since the measuring light is reflected also by the original glass plate itself, there is a possibility that a detection error would arise due to ingress of the reflected light from the original glass plate.

Namely, since a surface of the original glass plate is approximately similar to a mirror surface, almost all parts of reflected light at the original glass plate surface reflect in a direction symmetric to a direction of incidence with respect to a normal line for the surface in a concentrated manner, as in case of reflection at a mirror surface (a light path of this case is called "major path" hereunder).

The original glass plate has two surfaces which reflect the measuring light in the above manner: One is a lower side surface where the measuring light enters the original glass plate and another is an upper side surface which contacts with the original document, and the major path exists for both surfaces respectively. These major paths are practically overlapped each other if said two surfaces are parallel.

In conventional apparatuses, a light receiving device adapted to catch the reflected light from the original document surface is installed in at least any one of said two major paths so that it may also catch the reflected light from the original glass plate. Therefore, the reflected light from the document surface could not be identified from the reflected light from the original glass plate depending on a original document surface condition, thus the original document would not be detected correctly.

SUMMARY OF THE INVENTION

An object of the invention is to provide a document detecting apparatus which can remove an influence of reflected light from an original glass plate to securely detecting an original document.

This invention provides a document detecting apparatus comprising an optical measuring means having a light projecting device which emits a measuring light from an inside to an outside of a copying machine through an original glass plate, and a light receiving device which is installed at a position deviated from a path symmetric to an optical axis of said measuring light with respect to a normal line set up on a surface of the original glass plate and which is directed to receive a scattered light produced from the measuring light scattered at a surface of an original document placed on the original glass plate; and a judging means which judges whether or not the original document exists according to an intensity of a light measured by said optical measuring means.

In this invention, a relation between the light projecting device and the light receiving device deviate from a relation between said two major paths of the original glass plate. In other words, both the light projection device and the light receiving device are not placed in the positions symmetrical with respect to the normal line for any surface of the original glass plate. Consequently, an extent of receiving the reflected light from the surface of the original glass plate is extremely reduced.

On the other hand, the document surface is generally a scattering surface so that the light is scattered and reflected with some extent of spreading and a difference caused by direction is remarkably small as compared with the reflection at the surface of the original glass plate. Namely, the extent of receiving the reflected light on the major path from the original document surface is scarcely reduced.

Therefore, a ratio of a reflected light from the original document to a reflected light from the original glass plate among the total received light can be increased and S/N ratio can be improved. Thus a secure document detection will be accomplished.

DETAILED DESCRIPTION OF THE PREFERRED EMBODIMENT

Figure 1:
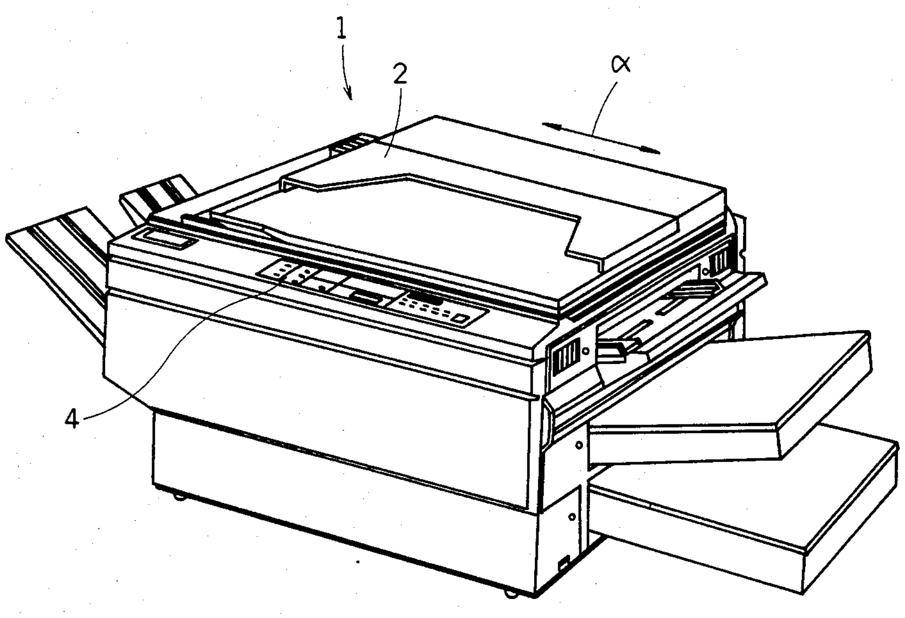
FIG. 1 is an oblique view of a copying machine incorporating a document detecting apparatus according to the present invention.
Figure 2:
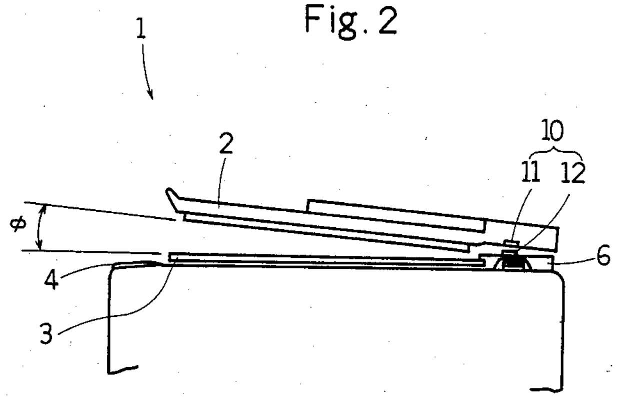
FIG. 2 is a schematic side view showing a state of closing a cover of the copying machine shown in FIG. 1.

In FIG. 1 and FIG. 2, a copying machine 1 is a type of copying machine which carries out a copying operation with an original cover 2 slidden in a direction of $\alpha$ together with an original document and an original glass plate 3.

Figure 3:
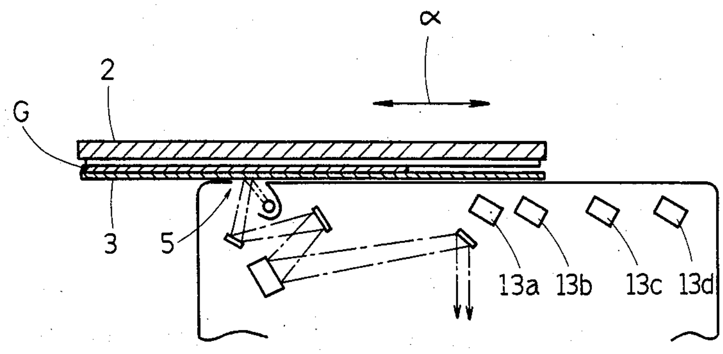
FIG. 3 is a schematic sectional view showing an arrangement of a light measuring means installed in the copying machine.

When setting the original document, the original cover 2 is lifted and opened widely as shown in FIG. 2, the original document is placed on the original glass plate 3, the original cover 2 is closed and a print button of an operation panel 4 is pushed. Then, a sliding member 6 is slidingly driven in the direction of $\alpha$ so that both the original cover 2 and the original glass plate 3 supported by said sliding member 6 slide in the direction of α with the original document G held therebetween as shown in FIG. 3. Since a surface of the original document G passes thereby through a slit 5, its contents are read and copied. The construction of the copying machine 1 with regard to these functions is basically similar to a well-known construction.

However, the copying machine 1 differs from a conventional one in the following points that this copying machine 1 is equipped with a document detecting apparatus 20 comprising a cover closing state detecting means 10, optical measuring means 13*a*∼13*d* and a judging means included in a microprocessor 14, and that these optical measuring means 13*a*∼13*d* comprise reflection type photo-sensor formed integrally of an optical projector and an optical receiver and are disposed in such positions as underside of and inclined against the original glass plate 3.

The cover closing state detecting means 10 is composed of a magnet 11 fitted to the original cover 2 and a reed switch 12 fitted to the sliding member 6 on the opposite side of the magnet 11. Since a distance between the magnet 11 and the reed switch 12 is large when the original cover 2 is opened, the reed switch 12 is under an OFF state. However, since the magnet 11 gets near to the reed switch 12 as the original cover 2 becomes closed, the reed switch 12 becomes to an ON state when the cover 2 is closed to a predetermined position. In this instance, an angle $\phi$ made by the original cover 2 and the original glass plate 3 can be properly adjusted by a size or a position of the magnet 11. This angle $\phi$ is preferably adjusted to below 15 degrees and further to a range of below 10 degrees and above 5 degrees.

Figure 4:
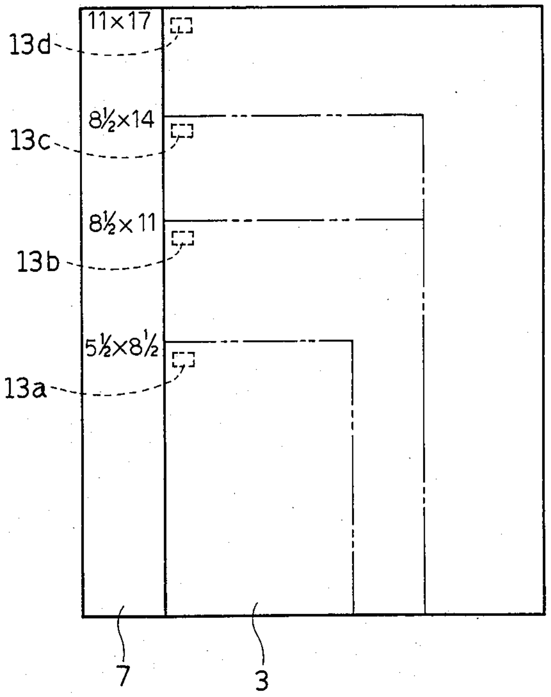
FIG. 4 is an explanatory view showing correspondence of the optical measuring means with standard of document size.

The optical measuring means 13*a*∼13*d* can be composed of photo-sensors which are formed integrally of pairs of light emitting diodes and photo transistors. These plural optical measuring means 13*a*∼13*d* are arranged under the original glass plate 3 respectively corresponding to standard document sizes $5\frac{1}{2}\times8\frac{1}{2}$, $8\frac{1}{2}\times11$, $8\frac{1}{2}\times14$ and $11\times17$ used in the copying machine 1. FIG. 4 shows the arrangement of them.

A noteworthy point is that these photo-sensors, i.e. optical measuring means 13*a*∼13*d*, are inclined by an angle $\theta$ with respect to the original glass plate 3. This inclination of $\theta$ will be described later in details. It is preferable to set the angle to $\theta=15^\circ\sim60^\circ$ and further to a vicinity of 30 degrees.

The judging means is included as a part of function in a microprocessor 14 which is provided as a center of control, and judges an existence of the original document depending on an intensity of an incident light measured by said optical measuring means 13*a*∼13*d*.

Figure 5:
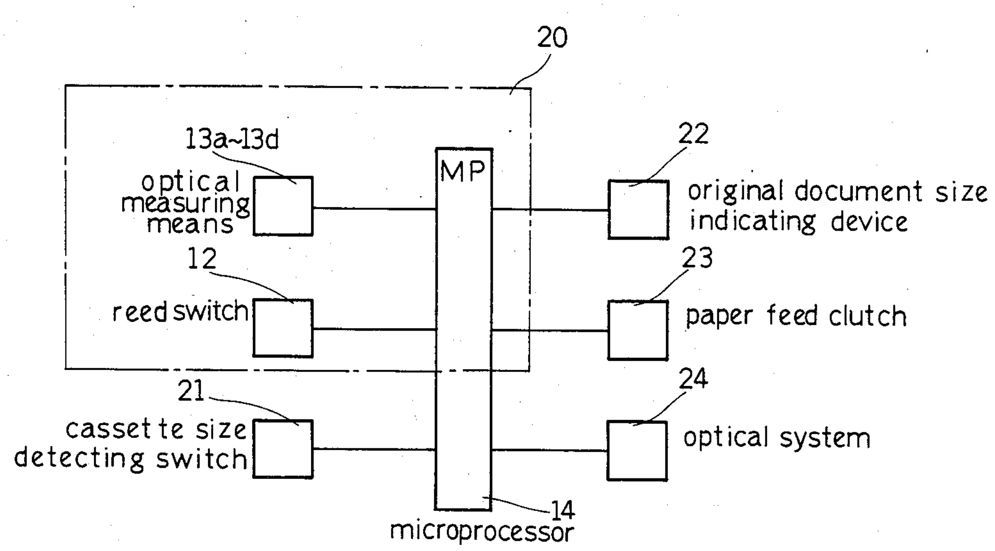
FIG. 5 is a block diagram of control system for the copying machine shown in FIG. 1.

FIG. 5 shows a control system of the copying machine 1 in which the optical measuring means 13*a*∼13*d*, the reed switch 12 of the cover closing state detecting means 10, a paper cassette size detecting switch 21, a document size indicating device 22, a paper feed clutch 23 and an optical system 24 reading contents of the document are connected to the microprocessor 14.

Function will be described hereunder with reference to FIG. 6.

First, a step S1 is an operation of setting the original document and means such operation that an operator opens the original cover 2 and places the original document on a specified position of the original glass plate 3. This specified position is indicated on a frame 7 of the original glass plate 3 as shown in FIG. 4.

After setting the original document, the operator closes the original cover 2. Then, the reed switch 12 will be switched to ON when the original cover 2 is closed to the specified angle $\phi$. A step S2 means an operation of switching ON of the reed switch 12.

Figure 7:
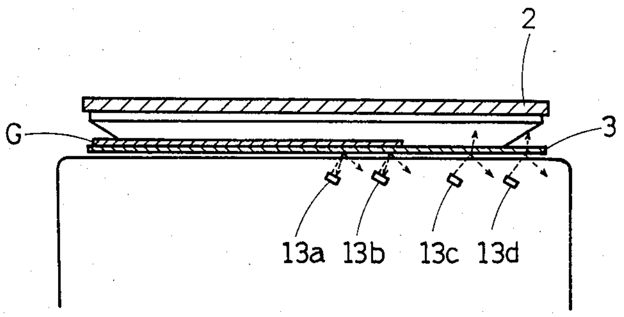
FIG. 7 is an explanatory view explaining a reflection of measuring light caused by a original document.

When the microprocessor 14 detects that the reed switch 12 is switched to ON, the phototransistor measured a reflected light. The light emitting diodes may be made emit light continuously or only at the time of this measurement. FIG. 7 is a view showing this state.

In case of the reflected light detecting system, an error of detection due to an ingress of foreign light would occur. Namely, the detection of foreign light would cause a miss judgement that a document is existing even though such a document does not exist. In conventional apparatuses, such an improvement has therefore been made that the reflected light is identified from the foreign light by using a modulated light. However, this improvement is arising another problems of complicated mechanism etc.

While in the document detecting apparatus 20, the reflected light from the original document G is measured under the state immediately before the original cover 2 is closed completely.

Namely, the cover closing state detecting means 10 outputs a closing state detecting signal when the original cover 2 of the copying machine 1 is closed onto the original glass plate 3 to the specified position of immediately before being closed completely. Upon the closing state detecting signal being outputted, the optical measuring means 13*a*∼13*d* measure the reflected light, which are arranged at specified positions inside of the original glass plate 3 and measure the light entering from outside to inside through the original glass plate 3.

Since the foreign light is therefore shut out by the original cover 2 under this state, a bad influence of the foreign light can be eliminated. Further, the original cover 2 is not completely closed so that a bad influence caused by the reflected light from a bottom face of the original cover2 can be avoided. In this manner, such a timing of securely detecting the existence and size of the original document is taken by eliminating the influence of foreign light using a simple mechanism without creating complication thereof.

Now, FIG. 7 shows a case of $8\frac{1}{2}\times11$ sized original document G. In this instance, the lights emitted from the optical measuring means 13*a* and 13*b* pass through the original glass plate 3 to the original document G placed thereon and are scattered and reflected thereat, then pass through the original glass plate 3 again to return to the optical measuring means 13*a* and 13*b*. Thereby, the scattered reflected lights are measured by the optical measuring means 13*a* and 13*b*.

In case of the optical measuring means 13*c* and 13*d*, however, since no original document G exists, after the lights emitted from those means pass through the original glass plate 3, they pass through it intactly without being scattered and reflected. These lights are irradiated on and reflected from the bottom face of the original cover 2, but the reflected lights do not substantially get to the optical measuring means 13*c* and 13*d* because the optical cover 2 is inclined at the time of measurement and distances to the optical measuring means 13*c* and 13*d* are large. Further, the foreign light is also shut out by the original cover 2 so that it does not get to the optical measuring means 13*c* and 13*d*. Therefore, the reflected light (and the foreign light) will not be detected at these optical measuring means 13*c* and 13*d*.

Accordingly, the microprocessor 14 of the judging means makes judgements as: the original document is existing at the optical measuring means 13*a*, existing at 13*b*, not existing at 13*c*, and not existing at 13*d*.

The document size $5\frac{1}{2}\times 8\frac{1}{2}$ corresponds to the optical measuring means 13*a* and the size $8\frac{1}{2}\times 11$ corresponds to the means 13*b*.

Since the size $8\frac{1}{2}\times 11$ is larger than the size $5\frac{1}{2}\times 8\frac{1}{2}$, the microprocessor 14 makes judgement as: a size of the original document G to be copied next is $8\frac{1}{2}\times 11$.

The above-mentioned is a step S3.

In order to improve a reliability of measurement, the photo-sensors of the optical measuring means 13*a*~13*d* are inclined with respect to the original glass plate 3 for avoiding the detection of reflected lights by the original glass plate 3 itself. This will be described later in detail.

In a step S4, the document size judged by the microprocessor 14 is displayed on the document size indicating device 22.

Further, when "Automatic magnification setting key" is selected, magnification, an enlargement or reduction, is automatically set so as to be adapted to a specified paper.

On the other hand, when "Automatic paper selection key" is selected, a paper corresponding to the original document size is automatically selected. In the event that the paper corresponding to the original document size is exhausted, the situation is displayed. If desired, a ratio of usable paper size to the original document size is calculated and automatically set the magnification for enlarging or reducing.

Further, if a paper corresponding to the original document size can be selected, the paper of that size is automatically selected.

The operator looks at the indication of the copying machine 1, and if the situation satisfies him, he pushes the print button on the operation panel 4. Thereby, the original document G sandwiched between the original cover 2 and the original glass plate 3 slides in the direction of $\alpha$, and the copying operation is thus carried out. The above-mentioned is a step S5.

The copying operation is completed as above, and the reed switch 12 is switched to OFF when the operator opens the original cover 2 in order to take out the original document. A step 6 is a step for detecting the OFF state of the reed switch 12.

When the fact that the original cover 2 is opened is detected by switching OFF of the reed switch 12, the indication of the document size is reset. The above-mentioned is a step S7.

Figure 6:
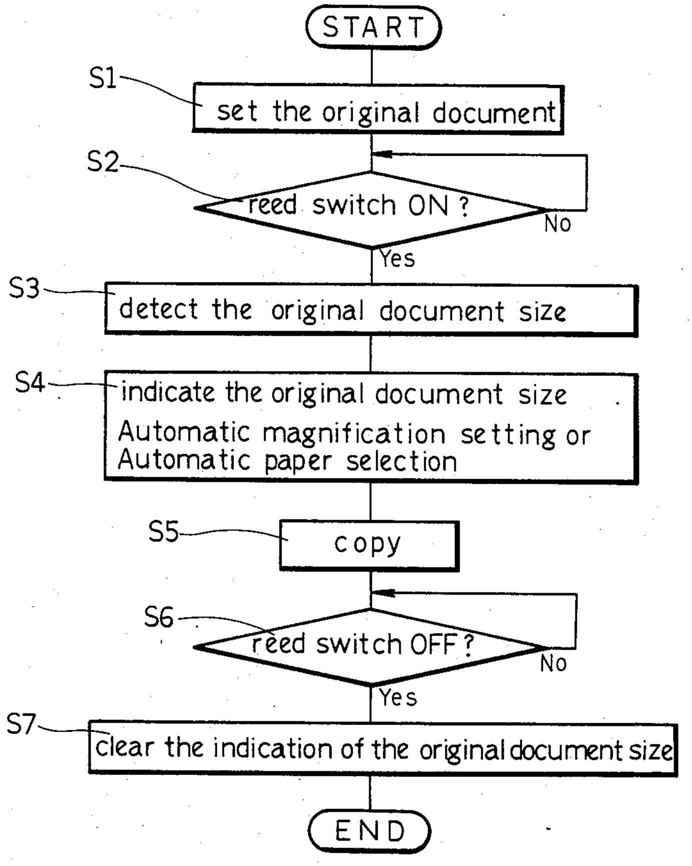
FIG. 6 is a flow chart of document detecting function.

Incidentally, although not shown in FIG. 6, when the original cover 2 is closed after the original document G is taken out, the microprocessor 14 judges that the original document G has been taken out by detecting absence of original document G.

While, if no such fact is recognized even though a comparatively long time (five minutes for example) has elapsed after completion of the copying operation, the microprocessor 14 makes judgement as "failure to take out the original document" and informes the operator of the failure by an alarm.

Next, a characteristic of the detected amount of scattered reflected light versus the angle $\theta$ with which the photo-sensors for the optical measuring means 13*a*~13*d* are inclined with respect to the original glass plate 3 will be described hereunder.

Figure 8:
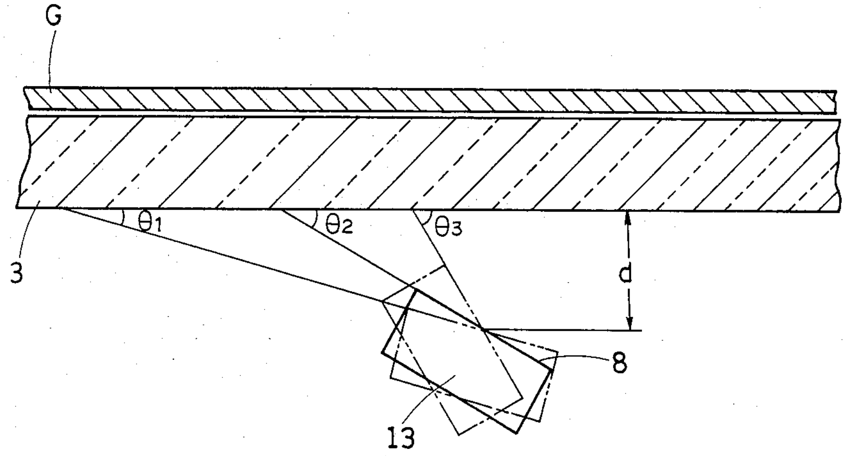
FIG. 8 is a schematic sectional view showing relative positions of an original glass plate and the optical measuring means.
Figure 9:
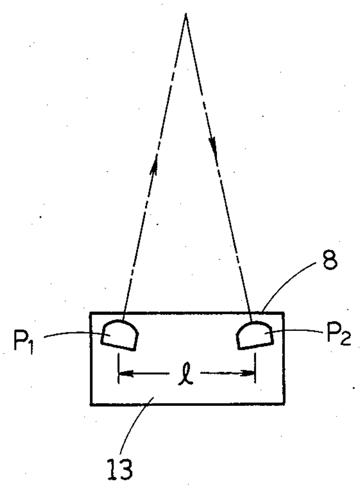
FIG. 9 is a schematic view of an example of a photosensor.

FIG. 8 is a schematic arrangement diagram for measuring above characteristic, and in which the original document G is set on the original glass plate 3.

The photo-sensor 13 is of type EE-SF5, Omron Tateishi Electronics Co. make, in which a light emitting diode $P_1$ is integrated with a phototransistor $P_2$ with a distance of $l=5.4$ mm kept therebetween and their optical axes are deviated toward inside by 12 degrees respectively to be intersected at a forward position with an angle of 24 degrees.

The distance between the original glass plate 3 and the center position between the light emitting diode $P_1$ and the phototransistor $P_2$ on the front face 8 of the photosensor 13 is set by distance of $\alpha=5$ mm, the photo-sensor is inclined with an inclination angle $\theta$ so as to position the light emitting diode $P_1$ to a lower side, and this $\theta$ is changed from 0 degree to 60 degrees. The same effect will be obtained if the phototransistor $P_2$ is brought to the lower side. Incidentally, in FIG. 8 the inclination angle $\theta$ is changed as $\theta_1=15°$, $\theta_2=30°$, $\theta_3=60°$.

Figure 10:
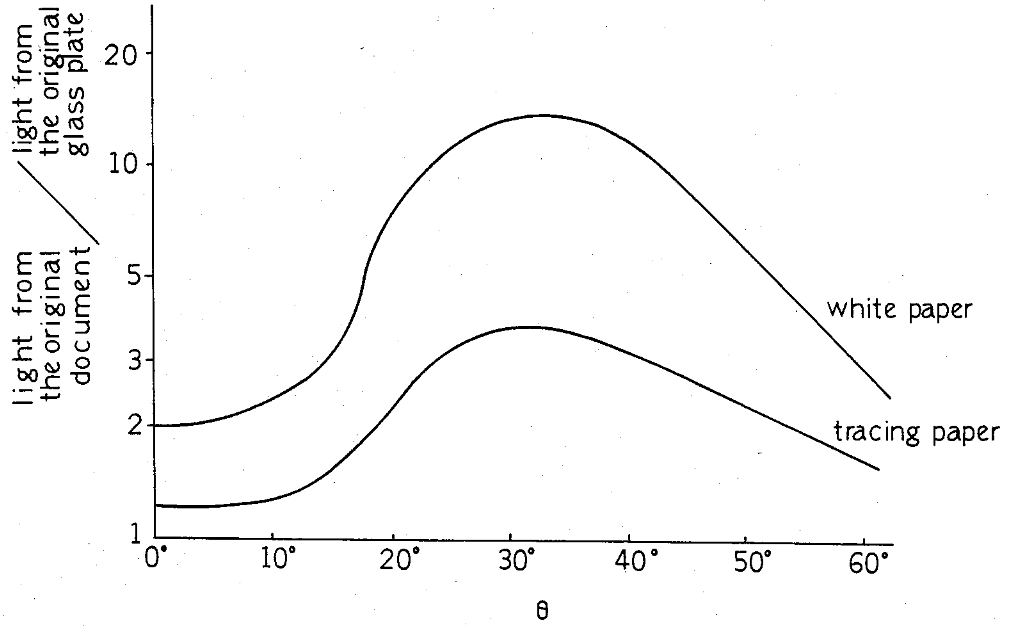
FIG. 10 is a characteristic diagram of an intensity of reflected light.

The measured reflected light is indicated in FIG. 10 as a ratio to a received light amount for no original document G existing (its component is the reflected light from the original glass plate 3).

As seen from FIG. 10, in case when the original document G is a white paper, a true scattered reflected light from the original document G can be detected by being preferably separated (at a ratio of more than 3) from the reflected light from the original glass plate 3 if the inclination angle $\theta$ of the photo-sensor 13 is taken as a value between 15 degrees and 60 degrees.

Further, in case when the original document G is a tracing paper, the true scattered reflected light can be separated and detected with the same level if the inclination angle $\theta$ of the photo-sensor 13 is taken as a value between 23 degrees and 44 degrees.

On the contrary, when $\theta=0$ degree i.e. when the photo-sensor 13 is made stand opposite to the original glass plate 3, the reflected light from the original glass plate 3 is detected much more so that the reflected light from the original document G becomes hard to be identified and its detection reliability becomes worse although the original document G is detectable. Moreover, when the angle $\theta$ is taken as a value more than 60 degrees, the reliability will become worse too.

As can be understood from the above result, the bad influence of reflection at the original glass plate 3 can be removed by slantly arranging the optical measuring means 13*a*~13*d* with respect to the original glass plate 3.

The reason why such result is induced is supposed to be as follows.

Since the surface of the original glass plate 3 is approximately similar to the mirror surface, the reflection at this surface is carried out, as in case of reflection at the mirror surface, in such a way that almost all parts of light reflect in a direction symmetric to an incident direction with respect to the normal line i.e. along the major path in a concentric manner.

On the other hand, the surface of the original document G is generally the light scattering surface so that the light is scattered and reflected with some extent of spreading and an influence caused by difference of direction is remarkably small as compared with the reflection at the surface of the original glass plate 3.

Therefore, if the light projecting device and the light receiving device are installed at positions deviated from the major path of reflection at said original glass plate 3, a ratio of scattered reflection component at the original document G to a reflection component at the original glass plate 3 among the total received light amount can be improved. This means an improvement in the S/N ratio itself to provide the sure detection of original document.

In the present invention, inclining the optical measuring means 13*a*~13*d* corresponds to deviating the path between the light projecting device and the light receiving device from said major path.

Another embodiment of this invention includes such an apparatus suitable for a copying machine of a type wherein the original document stands still but an optical system moves and scans the entire area of the original document to read its contents, contrary to a type wherein the original document G is moved and the entire area thereof is scanned to be read its contents as in case of the present invention. In this case, since the optical system moves under the original glass plate, the optical measuring means can not be installed in this range of movement. Therefore, the optical measuring means may be installed out of the moving range of the optical system, the light may be emitted from an oblique lateral side to the original document on the original glass plate and the reflected light caused by scattered reflection at the original document surface may be caught.

If a measuring object is the mirror surface, it will be impossible to irradiate the light from the oblique direction and catch the reflected light in the same direction as the incident direction. However, since the original document to be copied is an ordinary paper and the light is scattered at its surface, the detection becomes possible.

As seen from the above description, in the said document detecting apparatus 20, the true reflected light at the document surface can be securely detected under situations that the foreign light is shut out by the original cover 2 and the original cover 2 does not completely cover the original glass plate 3 yet with no reflection at its underside, and further the bad influence of reflection at the surface of the original glass plate 3 is avoided. Therefore, a highly reliable document detection becomes possible.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A document detecting apparatus comprising an optical measuring means having a light projecting device which emits a measuring light from an inside of to an outside of a copying machine through an original glass plate, and a light receiving device which is installed at a position deviated from a path symmetric to an optical axis of said measuring light with respect to a normal line set up on a surface of the original glass plate and which is directed to receive a scattered light produced from the measuring light scattered at a surface of an original document placed on the original glass plate; a cover closing state detecting means which outputs a closing state detecting signal when an original cover of the copying machine is closed onto the original glass plate to a specified position immediately before being completely closed; and a judging means which judges that an original document exists when scattered light is received by said light receiving device or that an original document does not exist when scattered light is not received by said light receiving device and said closing state detecting signal is outputted.

2. A document detecting apparatus as set forth in claim 1, in which the optical measuring means is so constructed that the light projecting device and the light receiving device are integrated together and the integrated body is disposed at a specified position under the original glass plate so as to be directed to the original glass plate and inclined at a specified angle.

3. A document detecting apparatus as set forth in claim 2, in which the specified angle by which the optical measuring means is inclined with respect to the original glass plate is 15 degrees or more and 60 degrees or less.

4. A document detecting apparatus as set forth in claim 3, in which the specified angle is about 30 degrees.

5. A document detecting apparatus as set forth in claim 3, in which the optical measuring means comprises a photocoupler formed integrally of a light emitting diode and a phototransistor.

6. A document detecting apparatus as set forth in claim 5, in which said specified position immediately before being completely closed is a position where an angle made by the original cover and the original glass plate is 10 degrees or less and 5 degrees or more.

* * * * *